No. 840,635. PATENTED JAN. 8, 1907.
J. C. LAMBERT.
WAGON TONGUE SUPPORT.
APPLICATION FILED DEC. 15, 1905.

Witnesses:
Chas. F. Bassett
M. A. Milord

Inventor
John C. Lambert
By Frederick Benjamin
Atty.

UNITED STATES PATENT OFFICE.

JOHN C. LAMBERT, OF TONICA, ILLINOIS.

WAGON-TONGUE SUPPORT.

No. 840,635.        Specification of Letters Patent.        Patented Jan. 8, 1907.

Application filed December 15, 1905. Serial No. 291,810.

*To all whom it may concern:*

Be it known that I, JOHN C. LAMBERT, a citizen of the United States, residing at Tonica, in the county of Lasalle and State of Illinois, have invented certain new and useful Improvements in Wagon-Tongue Supports, of which the following is a specification.

This invention relates to improvements in means for supporting the tongues of wagons, whereby the weight of the tongue is taken from the horses' necks.

The especial object of the improvements which form the subject-matter of this application is to provide a tongue-support that will permit the wagon to be fully dumped or tilted as required at the modern crib-elevator dumps for corn, where the wagon is drawn upon a platform which is tilted at an angle of forty-five degrees, thus dumping the contents of the wagon into a crib located below and at the rear of the platform. During this operation the wagon-tongue remains in a horizontal position. In tongue-supports heretofore used a limited tilting of the wagon-body is possible without affecting the tongue; but this is not sufficient in the conditions above mentioned, and my invention is designed to meet such conditions and to serve other utilities which need not be specified.

Figure 1:
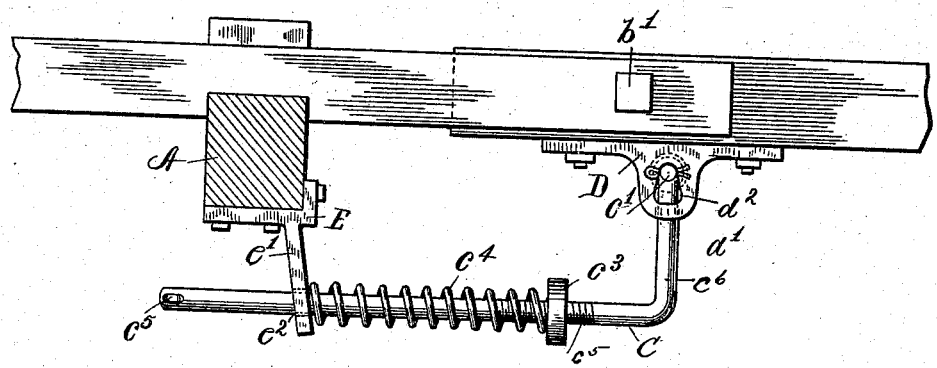
Figure 2:
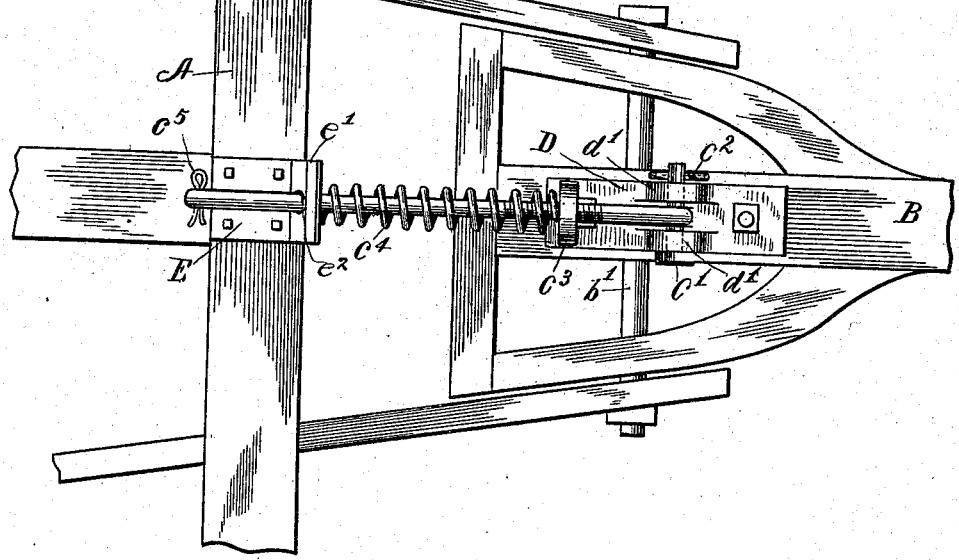

In the drawings, which form a part of this application, Figure 1 is a side elevation of my invention as applied to the gear and tongue of a wagon. Fig. 2 is a bottom plan view of the parts shown in Fig. 1.

Referring to the drawings in detail, A represents a portion of the front axle of a wagon to which a reach and hounds are secured in any well-known manner.

B represents the rear portion of a tongue of ordinary construction and same is pivotally mounted on the tongue-hounds by a bolt $b'$. Bolted to the under side of the rear portion of the tongue is an iron plate D, which is formed with two spaced depending lugs $d'$, in which are formed vertical slots $d^2$, the cross-diameter of the lower portion of which is slightly greater than the cross-diameter of the upper part. In the slots $d^2$ is loosely arranged a bolt $c'$, through one end of which a cotter-pin $c^2$ is passed.

Bolted to the under side of the axle is an iron plate E, which is formed with a depending extension $e'$, through which a hole $e^2$ is formed. On the bolt $c'$ is pivotally mounted the forward end of a rod $c$. This rod is bent at right angles to provide a vertical portion $c^6$, and its horizontal portion is slidably arranged in the opening $e^2$ in the plate E. In the rear end of the rod a cotter-pin $c^5$ is inserted. For a portion of its length the rod is threaded, as at $c^5$, and on this portion is mounted a nut $c^3$. Mounted on the rod between the nut and the extension $e^2$ is an expansion coil-spring $c^4$, the ends of which normally bear against said nut and extensions, respectively, so that the tension of the spring is exerted to support the weight of the tongue and hold the latter in a position dependent upon the adjustment of the nut $c^3$, as will be readily understood.

Through the movement of the bolt in the slots $d^2$ at the pivotal point of the rod $c$ I am able to provide a greater range of movement of the rod $c$ relative to the plate E without causing the rod to bind on its bearings in the extension $e'$, as will be readily apparent, and thus overcome the difficulties hereinbefore referred to.

I am aware that tongue-supports having the general characteristics of the one herein described are not new in the art, and I do not claim such features broadly; but

What I claim is—

1. In a tongue-support, a plate secured to the under side of the tongue and having elongated vertical slots therein, a bar bent to form a vertical member and a horizontal member, the vertical part being pivotally connected with said plate, and the horizontal part being threaded, a slotted plate secured to the wagon-axle, its slot receiving the horizontal member of said bar, a coil-spring arranged on said bar and bearing at one end against said axle-plate, and a nut mounted on the threaded portion of said bar as a bearing for the other end of said spring.

2. In a tongue-support, a plate secured to the tongue and having elongated slots therein, a rod pivotally mounted in said slots, the pivot being of less cross-diameter than the greatest cross-diameter of the slots, and means for holding said bar under tension substantially as set forth.

In testimony whereof I affix my signature in presence of two witnesses.

JOHN C. LAMBERT.

Witnesses:
  W. J. EBNER,
  EVA L. GAY.